(12) United States Patent
Nicolas

(10) Patent No.: US 6,876,344 B2
(45) Date of Patent: Apr. 5, 2005

(54) FLAT THERMIONIC EMISSION SCREEN AND WITH INTEGRATED ANODE CONTROL DEVICE

(75) Inventor: Pierre Nicolas, Sr Eqre've (FR)

(73) Assignee: Commissariat a l 'Energie Atomique, Paris (FR)

( * ) Notice: Subject to any disclaimer, the term of this patent is extended or adjusted under 35 U.S.C. 154(b) by 286 days.

(21) Appl. No.: 10/076,454

(22) Filed: Feb. 19, 2002

(65) Prior Publication Data

US 2002/0126072 A1 Sep. 12, 2002

(30) Foreign Application Priority Data

Mar. 9, 2001 (FR) .............................................. 01 03236

(51) Int. Cl.⁷ .............................................. G09G 3/22
(52) U.S. Cl. ........................ 345/75.2; 345/205; 345/76; 315/169.3
(58) Field of Search ................ 345/55, 74.1, 75.1–75.2, 345/204–205, 345, 76–83; 313/495–497, 167–168, 336, 351, 309; 315/169.1, 169.3

(56) References Cited

U.S. PATENT DOCUMENTS 4,908,539 A  * 3/1990 Meyer ..................... 315/169.3
5,153,483 A  * 10/1992 Kishino et al. ................. 315/3
5,225,820 A    7/1993 Clerc
5,488,386 A  * 1/1996 Yamagishi et al. ......... 345/74.1
5,689,151 A  * 11/1997 Wallace et al. ............. 313/495
5,844,370 A  * 12/1998 Cathey et al. ........... 315/169.1
5,939,833 A  * 8/1999 Song et al. .............. 315/169.1
6,057,636 A    5/2000 Sakai et al.
6,186,850 B1 * 2/2001 Cathey et al. ................ 445/24

FOREIGN PATENT DOCUMENTS

| EP | 0306173 | 3/1989 |
| EP | 0362017 | 4/1990 |
| EP | 0747874 | 12/1996 |

* cited by examiner

Primary Examiner—Lun-yi Lao
(74) Attorney, Agent, or Firm—Thelen Reid & Priest LLP

(57) ABSTRACT

A flat thermionic emission screen (1) has a first substrate (2) on which are arranged an emission cathode (4) and an electron extraction grid (8), a second substrate (12) facing the first substrate (2) on which is arranged an anode (14) designed to collect the electrons emitted by the cathode (4), and an electronic control circuit of the anode (14) voltage having at least one commutation component (18, 20). The commutation component (18,20) is built into the first substrate (2) and in the second substrate (12) of the screen (1).

8 Claims, 5 Drawing Sheets

FLAT THERMIONIC EMISSION SCREEN AND WITH INTEGRATED ANODE CONTROL DEVICE

This application claims priority under 35 U.S.C. §§119 and/or 365 to 01 03236 filed in France on Mar. 9, 2001; the entire content of which is hereby incorporated by reference.

TECHNICAL FIELD

The invention comes within the domain of flat screens operating according to physical emission principles using hot cathodes, field effect microtips or electron plane sources of the graphite or carbon type (nanotubes) etc.

More specifically, the invention concerns a flat thermionic emission screen comprising a first substrate on which are arranged an emission cathode and an electron extraction grid, a second substrate facing the first substrate on which is arranged an anode designed to collect the electrons emitted by the cathode, and an electronic control circuit of the anode voltage comprising at least one power commutation component.

The invention also concerns a microtip transistor.

BACKGROUND DESCRIPTION

FIG. 1 shows diagrammatically a flat screen 1 with microtips 6 recognized as comprising a first substrate 2 on which is arranged a cathode 4 fitted with microtips 6 controlled electrically by a $V_{cathode}$ voltage (earthed in the example shown in FIG. 1) and a grid 8 controlled electrically by a $V_{grid}$ voltage and provided with holes 10 in the positions of microtips 6. The first substrate 2 can be in glass or silicon or any other appropriate material. The flat screen 1 also comprises a second substrate 12 facing the first substrate 2 and on which is arranged an anode 14 constituting the emissive surface of the screen 1. Electrical conductors 15, transparent or not, are arranged on the internal surface of the anode 14. Phospor materials 17 are deposited on these electrical conductors 15.

In this device, the cathode 4 constitutes the source of electrons and the anode 14 collects these electrons. The emission of electrons by the microtips 6 is controlled by the potential difference (PD) applied between the extraction grid 8 and the cathode 4.

In practice, a matrix cathode is made having n grid conductor lines and p cathode conductor columns controlling the microtips. The electrical signals applied to these n lines and p columns then allow the image display of (n*p) points.

The collection of electrons from the microtips 6 is made by accelerating the latter using the "high voltage" applied on the anode conductors 15. Luminous emission is provided by the phosphor materials 17 under the impact of electrons received.

To make the screen 1, the first and second substrates 2 and 12 are sealed and a vacuum is made in the enclosed space thus obtained. Numerous technological variants of anodes are available. As an example, one can mention:

- single wire or multi-wire anodes for monochrome or three colour screens described in the publication from the CEA in the document "Recent development on microtips display at LETI", R. MEYER. LETI/CEA.
- reflective anodes for transparent cathode structure described in the patent N° FR 2 633 763 A of the CEA.

In all these variants one always finds the need to apply a high voltage to the anode which is generally a pulsatory current. The commutation of this high voltage is necessary, for example, for the generation of temporal colour subframes and for regeneration of the screen.

The generation of temporal colour subframes is a method for controlling the colour based on a sequential addressing of anode tracks carrying red, green and blue phosphors. This sequential addressing is carried out at a sufficiently high frequency so that the base colours, generated in each of the subframes of a pictorial time, "blend together" before the eye of the onlooker.

FIG. 2 represents a flat screen 1 of the prior art in which the anode 14 is monitored by a push-pull circuit 19, arranged outside the screen 1, and using high voltage switching transistors 18, 20. This circuit is connected to the emissive anode 12 by a conductor 22. On this diagram, the monitoring electronic circuits of the lines and columns of the cathode 2 are not shown as they do not concern the invention. The control circuit 19 of the transistors 18, 20 comprises a source of voltage 24 supplying a voltage Vdd and an optoelectronic coupler 26. The logical control signals, and therefore low voltage of this circuit, are symbolized by inputs v1 and v2.

To carry out a regeneration of the screen, the control process consists in scheduling regeneration phases during which a part of the conductors of the anode at least is at low potential and the microtips of the cathode are biased in an emission status. This control mode eliminates certain problems of colour shift.

FIG. 3 is a timing diagram giving an example of signal to be applied to the anode to generate temporal colour subframes.

FIG. 4 is a timing diagram representing an example of signal to be applied to the anode to make the regeneration of the screen 1.

FIG. 5 is a timing diagram representing the logical signals v1 and v2 to obtain the anode control voltage of FIG. 4.

In all cases, it is essential to switch the anode voltage using a high voltage commutation circuit.

Several solutions are used for this purpose among which the control assemblies with capacitive connection, load pump assemblies, etc. These variations of monitoring mode do not however change the principle of the "push-pull" circuit of N-channel Field effect transistors (FET). There is also a variant of this push-pull that uses two complementary transistors—one N-channel FET and one P-channel FET. This circuit is above all used in low voltage, the P-channel FETs having lower voltage resistance than the N-channel FET.

Whatever the method of anode control used, technological evolution of the electron emission screens leads to, in order to increase their brilliance, increasing the anode voltages up to kilovolts, or even dozens of kilovolts. The switching of anode voltages located in these fields then requires the use of rare and expensive special transistors in complicated and bulky assemblies. As an illustration, to switch voltages of 6 kilovolts, a circuit must be made using layouts with several HV transistors of the 1.6 kilovolt type. Apart from the size of these assemblies, they require taking considerable precautions when laying out the circuit considering the voltages handled on the outside of the screen.

The aim of the invention is to overcome the disadvantages mentioned above.

Another aim of the invention is to simplify the design of control circuits of flat screens and to reduce their size.

BRIEF SUMMARY OF THE INVENTION

According to the invention, the component of power commutation of the anode voltage electronic control circuit is integrated through design in the first and second substrates of the screen.

According to the invention, the said component of power commutation is a high voltage transistor with a first electrode integrated in the first substrate, a second electrode integrated in the second substrate, and a third electrode integrated in the extraction grid.

According to the invention, the cathode comprises conductor columns with microtips and the grid comprises perforated conducting lines crossing the said conductor columns at the positions of the said microtips.

According to the invention, the anode constitutes the emissive surface of the screen and comprises at least one conducting surface on which are deposited phosphor materials.

According to the invention, the electronic control circuit of the anode voltage is of the push-pull type and comprises furthermore a second transistor with the first electrode integrated in the first substrate, the second electrode integrated in the second substrate and connected electrically to the first electrode of the first transistor, and a third control electrode integrated in the extraction grid.

According to the invention, the transistor equipping the control circuit of the anode voltage comprises a first substrate on which the first electrode and a control grid are arranged, a second substrate facing the first substrate on which is arranged a second electrode designed for collecting the electrons emitted by the first electrode.

Preferentially, the first electrode constituting the cathode comprises conducting columns with sources of electrons, the control grid comprises perforated conducting lines crossing the said conducting columns at the positions of the said electron sources, and the second electrode comprises at least one conducting surface arranged facing the said sources of electrons.

According to the invention, the cathode is a microtip source.

According to the invention, the cathode is a nanotube source.

According to the invention, the screen comprises a logical control module made up of a low voltage source and an optoelectronic coupler.

According to the invention, the logical control module comprises a load pump insulated galvanically from the screen by a capacitor C.

BRIEF DESCRIPTION OF THE DRAWINGS

Other characteristics and advantages of the invention will come to light from the description which follows, taken as a non-restrictive example, with reference to the drawings below in which.

DETAILED DESCRIPTION OF EMBODIMENTS OF THE INVENTION

In the description that follows, the elements common to the screen of the prior art and the screen of the invention are designated by the same references.

Figure 1:
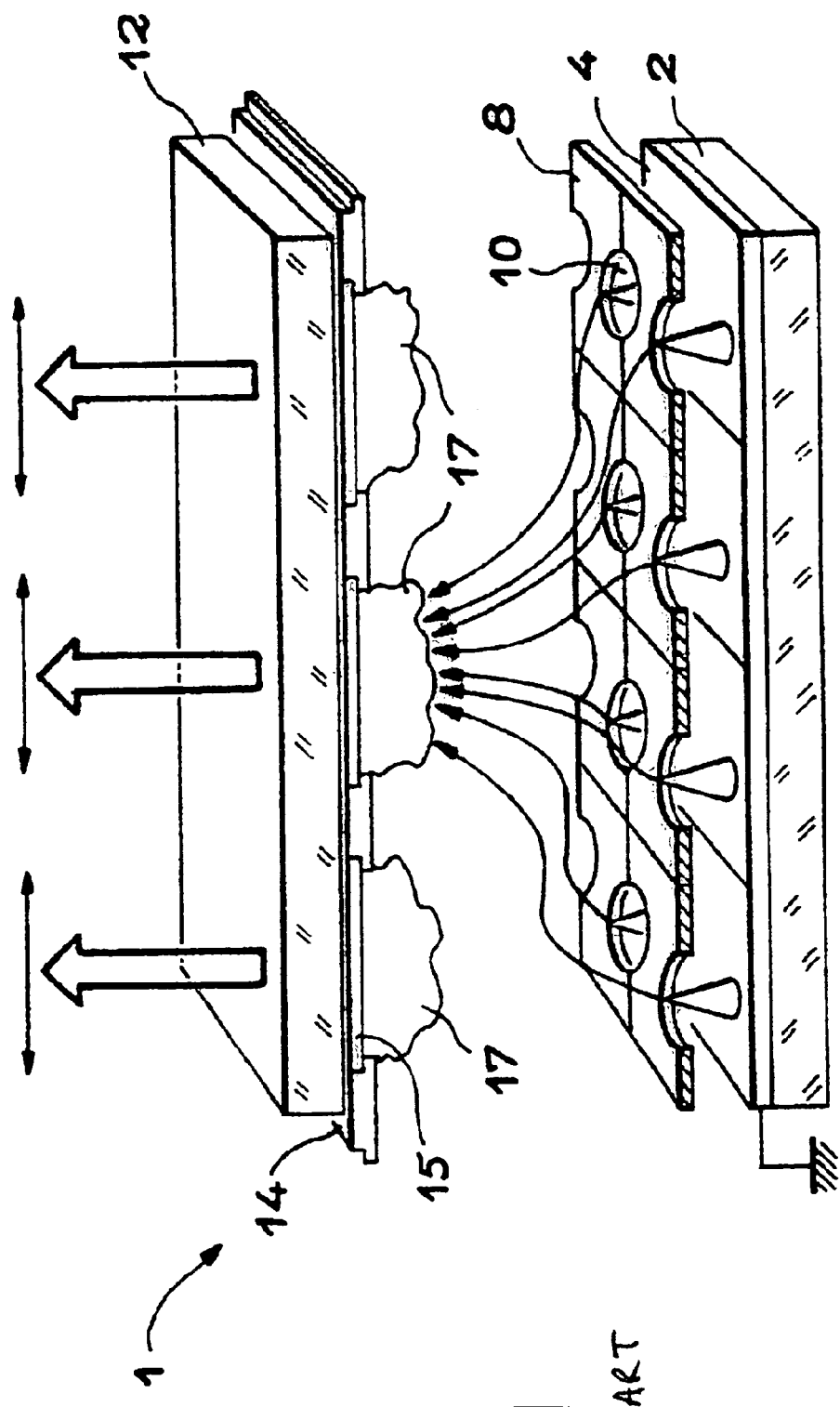
FIG. 1, described previously, represents diagrammatically a microtip screen of the prior art, FIG. 2, described previously, represents the flat screen in FIG. 1 connected to an external control circuit for the anode voltage, FIG. 3, described previously, represents a timing diagram illustrating a high voltage applied to the anode of the flat screen in FIG. 1 in order to generate temporal colour subframes, FIG. 4, described previously, represents a timing diagram illustrating a high voltage applied to the anode of the screen in FIG. 1 for screen regeneration, FIG. 5, described previously, represents the logical control signals of the transistors of the circuit in FIG. 2.
Figure 2:
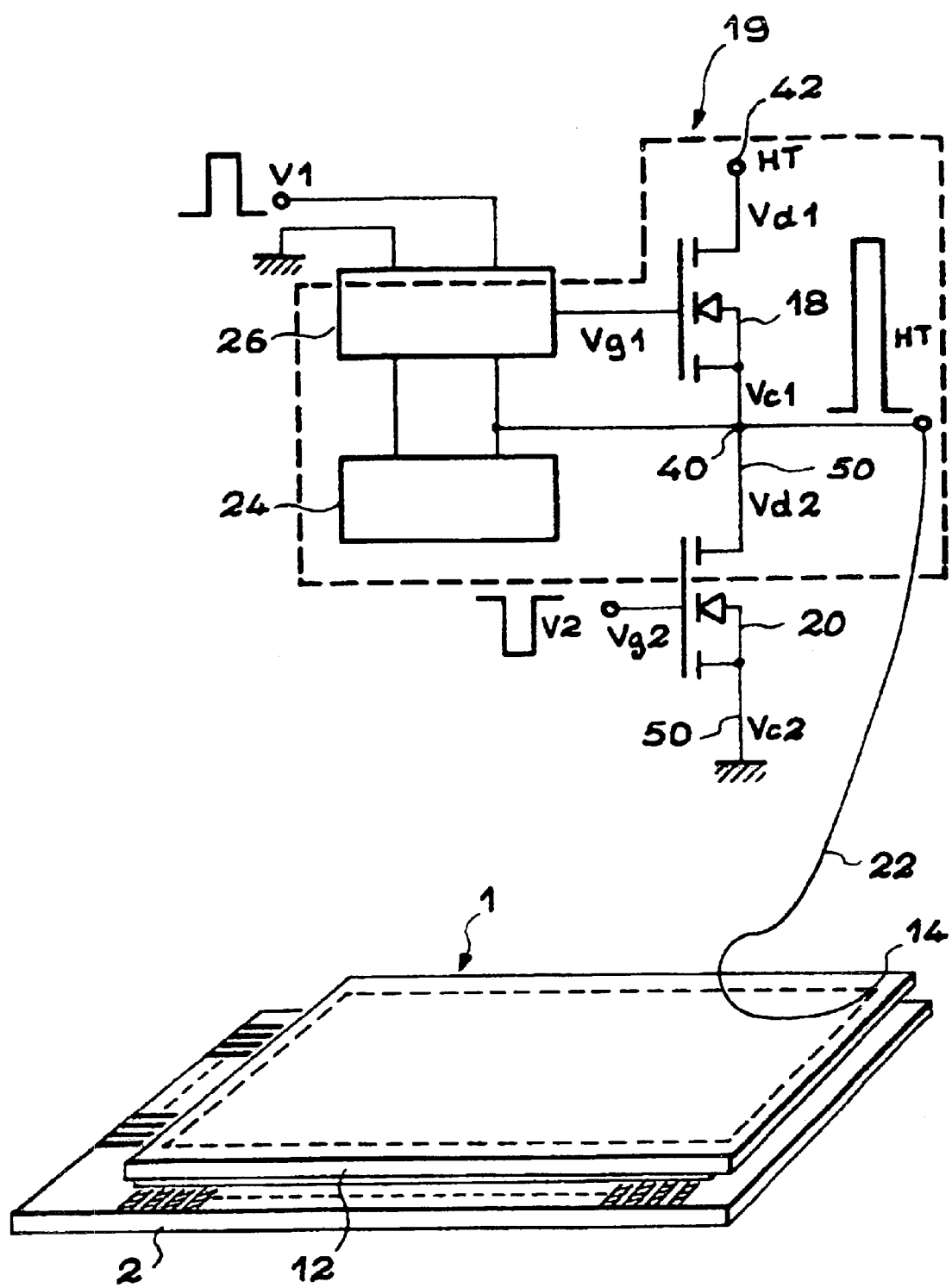
Figure 3:
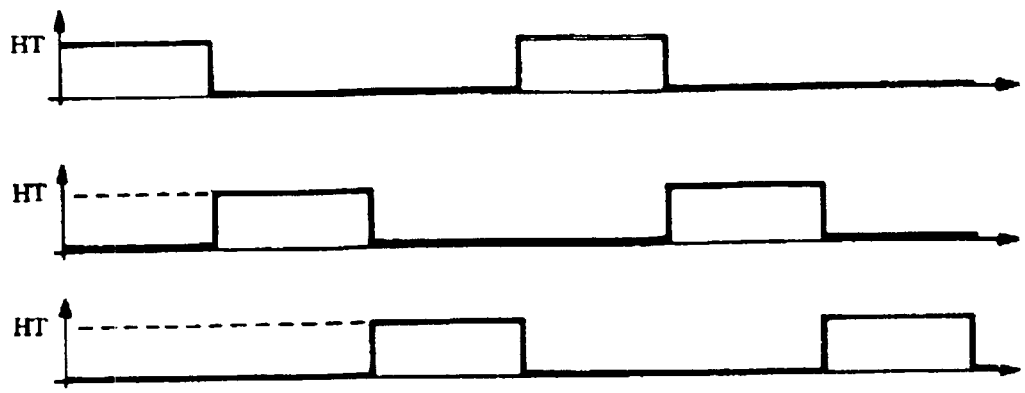
Figure 4:
Figure 5:
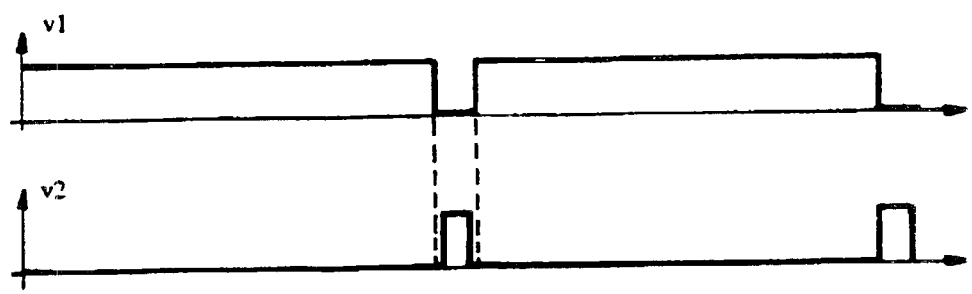
Figure 6:
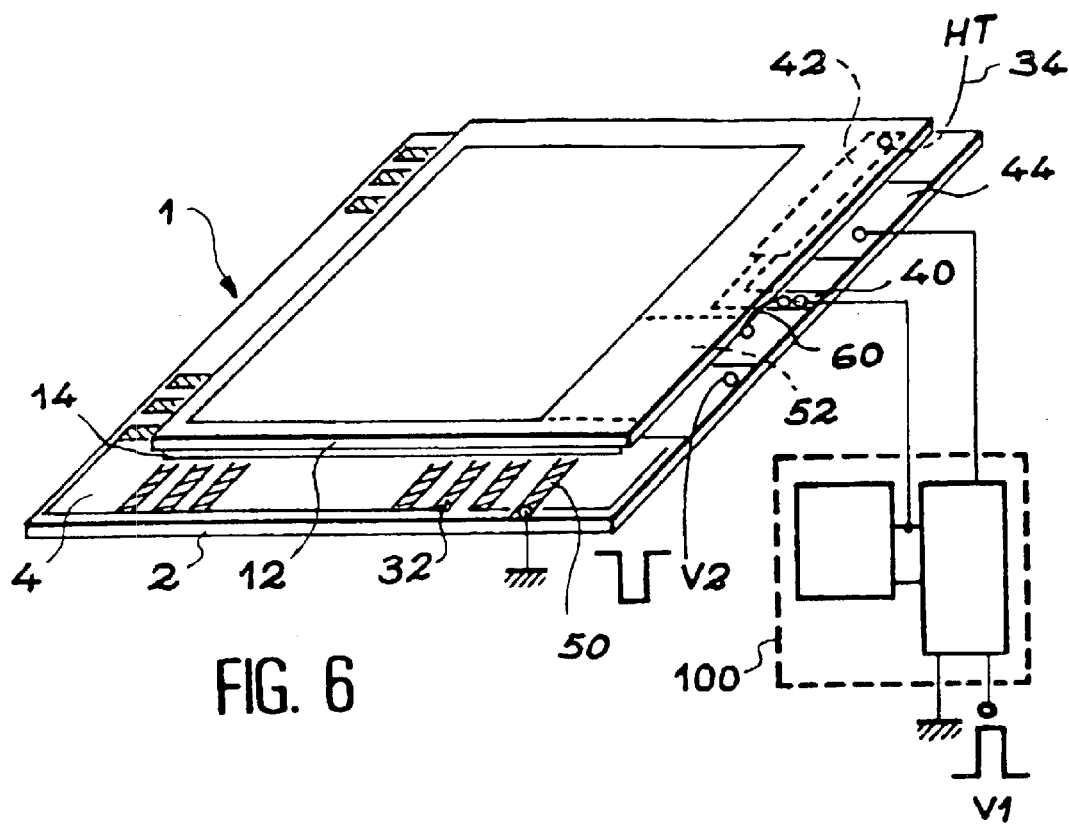
FIG. 6 illustrates diagrammatically a first realization mode of a microtip screen according to the invention.

FIG. 6 represents the first realization mode of a flat microtip screen 1 according to the invention comprising a first substrate 2 on which is arranged a cathode 4 comprising microtips 6 (see FIG. 1) arranged in lines and columns. An electron extraction grid 8 facilitates application of a sufficient voltage to the microtips 6 to extract the electrons. A second substrate 12 facing the first substrate 2 supports an anode 14 receiving a high voltage HV designed to accelerate the electrons freed by the microtips 6. The high voltage HV is controlled by a push-pull circuit comprising the first transistor 18 and a second transistor 20 entirely integrated in the first substrate 2 and in the second substrate 12 of the screen 1.

Figure 7:
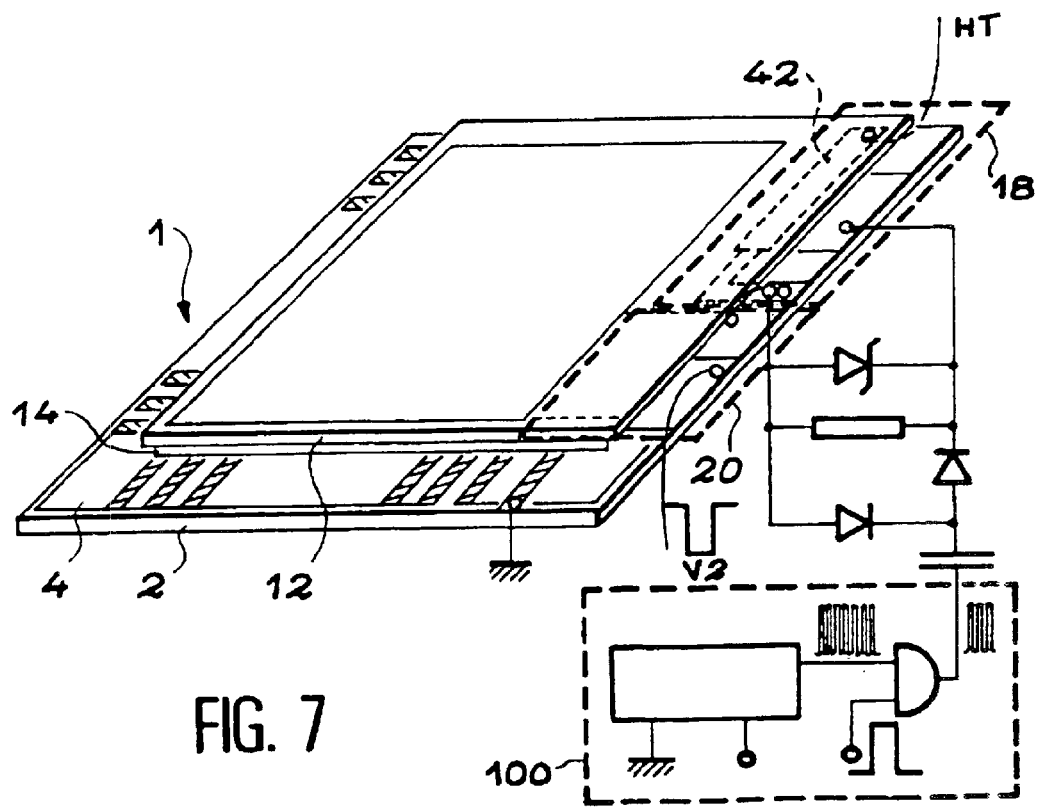
FIG. 7 illustrates diagrammatically a second realization mode of a microtip screen according to the invention.

FIG. 7 shows a second example of realization of the invention in which the two microtip transistors 18 and 20 remain unchanged. Only the logical part of control 100 is made using a load pump which provides the galvanic insulation of the logic as compared with the high voltage through the capacitor C.

In these two examples of realization, the transistor 18 has a first electrode 40 integrated in the first zone of the first substrate 2, a second electrode 42 integrated in the second zone of the second substrate 12, and a third electrode 44 integrated in a portion of the extraction grid 8 located between the said first and second zones.

The transistor 20 has the first electrode 50 integrated in a third zone of the first substrate 2, a second electrode 52 integrated in a fourth zone of the second substrate 12, and a third electrode 54 integrated in a second portion of the extraction grid 8 located between the third zone of the first substrate 2 and the fourth zone of the second substrate 12. The first electrode 40 of the first transistor 18 is connected electrically to the second electrode 52 of the second transistor 20 by a conducting wire 60. It is possible to choose other technological solutions to provide this connection, as for example an interconnection under vacuum inside the screen 1.

Figure 8:
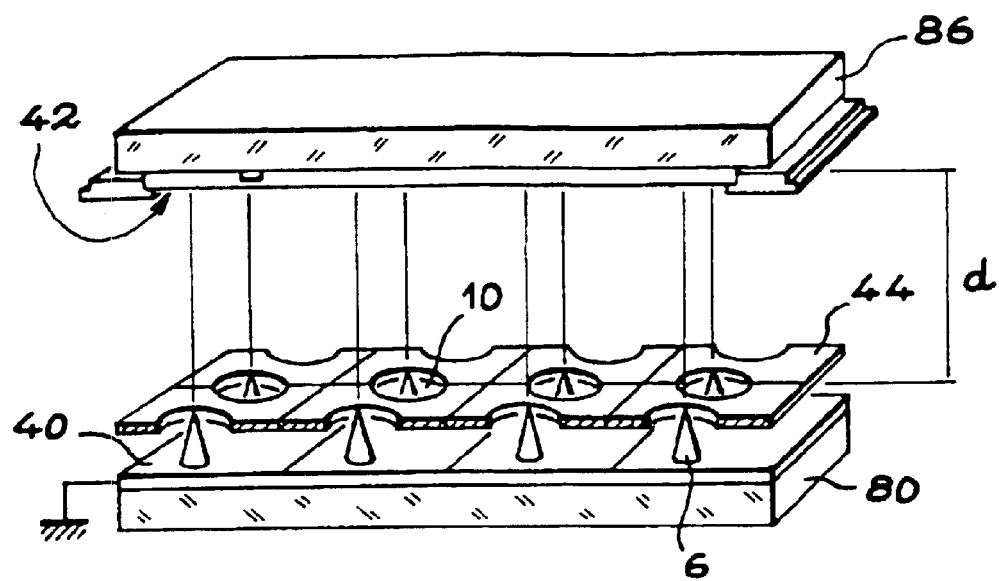
FIG. 8 illustrates diagrammatically a control transistor of the anode voltage for a screen according to the invention.

FIG. 8 represents a layout of the structure of transistors 18 and 20 revealing the similarity between the structure of the transistors 18, 20 and that of the screen 1.

The transistor 18 (respectively 20) comprises a first semi-conducting substrate 80 on which are arranged the first electrode 40 and a control grid 44 which is a portion of the extraction grid 8 of the screen 1. A second semi-conducting substrate 86 arranged facing the first semi-conducting substrate 80 has a second electrode 42 designed to collect the electrons emitted by the microtips 6 arranged in lines and columns on the first electrode 40. The control grid 44 comprises perforated conducting lines crossing the conducting columns of the first electrode 40 at the positions of the microtips 6.

In the examples of realization in FIGS. 6 and 7 described previously, the semi-conducting substrates 80 and 86 are an integral part of substrates 2 and 12 respectively of the screen 1. The electrodes of the transistors 18, 20 are made in these substrates.

Figure 9:
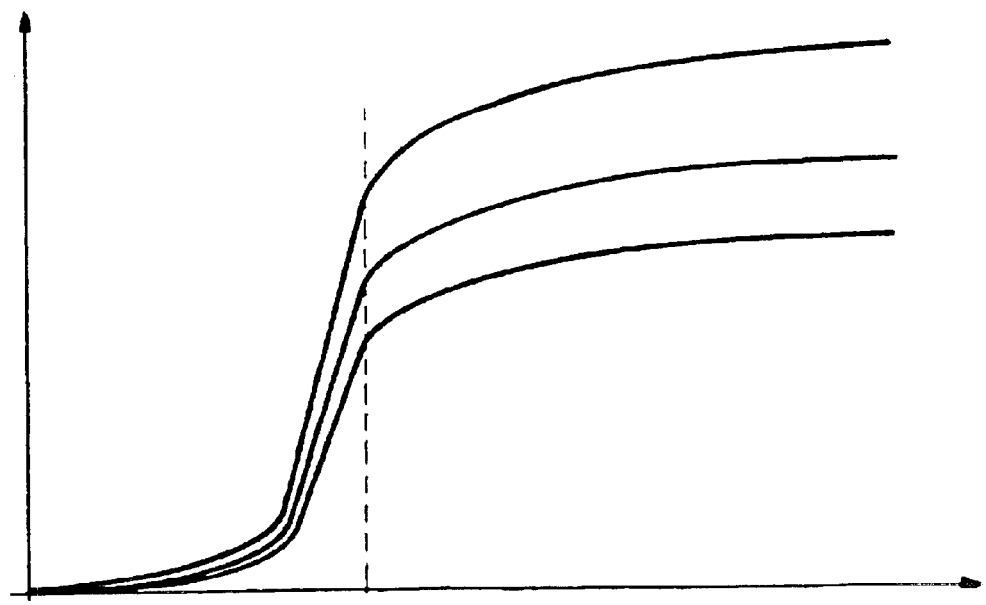
FIG. 9 represents the current-voltage characteristics of a microtip transistor according to FIG. 8.

FIG. 9 represents the current-voltage characteristics of a transistor 18, 20.

In practice, such microtip transistors differ from the ordinary MOSFET transistors (metal oxide semiconductor field effect transistor) through their threshold voltages V (grid-cathode)$_0$ and the saturation voltage V (anode-cathode)$_{sat}$ which today are several dozen volts rather than several volts for the ordinary MOSFET transistors. Voltage resistance of these microtip transistors is limited by the residual vacuum between anode and cathode. One therefore finds oneself with a voltage resistance of transistors which is that of the screen to be monitored as these transistors are integrated in the structure itself of the screen 1. Control of the anode 14 of the screen 1 by microtip transistors 18, 20 can be made by keeping the usual push-pull circuit. Considering the threshold voltages of several dozen volts, the only alteration required will be to supply a sufficient control voltage Vdd, between 10V and 100V maximum, so that when taking into account the size of the microtip transistors, the current necessary for the commutation of the screen 1 anode is available in the required time.

A reminder of typical technical specifications for monitoring a screen 1 of 1 dm$^2$ under Va=3 kV are shown below:

Anode capacity: Ca=330 pF

Require anode time=tc=100 μs

Maintaining this switch time requires a peak output current of the HV transistors of 10 mA for the 100 μs necessary for switching the anodes. Such a current will be easily issued by a microtip transistor of several 10 mm$^2$, i.e. a negligible surface as compared with the total surface of the screen. The practical realization of microtip transistors is made easier by the fact that the technological structure of these transistors is more simple than that of a screen.

It will be noted that on the screen 1, it is advisable to take precautions in lay-out to provide the galvanic insulation of the areas on which the electrodes are integrated.

Only the logical section of control 40 remains outside the screen 1. This is the low voltage part made up of the voltage source 24 of the optoelectronic coupler 26. This low voltage external control remains referenced to the source of the transistor 18 through the jumper wire to the connection Vc1.

Switching of the high voltage is henceforth provided by the microtip transistors 18, 20 integrated in the technological structures of the screen 1.

What is claimed is:

1. A flat thermionic emission screen (1) comprising:

a first substrate (2) on which are arranged an emission cathode (4) and an electron extraction grid (8), a second substrate (12) facing the first substrate (2), on which is arranged an anode (14) designed to collect the electrons emitted by the cathode(4), and an electronic control circuit (19) of the anode voltage (14) comprising at least one commutation component (18, 20), wherein the commutation component (18,20) is an HV transistor with a first electrode (40, 50) integrated in the first substrate (2), a second electrode (42,52) integrated in the second substrate (12) and a third electrode (44,54) integrated in the extraction grid (8).

2. The screen according to claim 1, wherein the anode (14) constitutes the emissive surface of the screen (1) and comprises at least one conducting 25 surface (15) on which phosphor materials (17) are deposited.

3. The screen according to claim 1, wherein the electronic circuit (19) is of the push-pull type.

4. The screen according to claim 1, wherein the cathode (4) comprises conducting columns (32) with sources of electrons (6), and in that the grid (8) 30 comprises perforated conducting lines crossing the said conducting lines at the positions of the said sources (6).

5. The screen according to claim 4, wherein the cathode (4) is a microtip source.

6. The screen according to claim 4, wherein the cathode (2) is a nanotube source.

7. The screen according to claim 1, further comprising a logical control module (100) comprising a low voltage source Vdd (24) and an optoelectronic coupler (26).

8. The Screen according to claim 7, wherein the logical control module (100) comprises a load pump galvanically insulated from the screen (1) by a capacitor C.

* * * * *